US012533896B2

(12) United States Patent
Takano et al.

(10) Patent No.: US 12,533,896 B2
(45) Date of Patent: Jan. 27, 2026

(54) PRINTING APPARATUS TO PREVENT PAPER-JAMMING

(71) Applicant: CANON KABUSHIKI KAISHA, Tokyo (JP)

(72) Inventors: Ryo Takano, Kanagawa (JP); Yasuhito Tsubakimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 18/490,512

(22) Filed: Oct. 19, 2023

(65) Prior Publication Data

US 2024/0131858 A1 Apr. 25, 2024
US 2024/0227421 A9 Jul. 11, 2024

(30) Foreign Application Priority Data

Oct. 24, 2022 (JP) ................................. 2022-170215

(51) Int. Cl.
*B41J 13/10* (2006.01)
*B65H 1/04* (2006.01)

(52) U.S. Cl.
CPC .............. *B41J 13/106* (2013.01); *B65H 1/04* (2013.01); *B65H 2405/10* (2013.01); *B65H 2405/11* (2013.01); *B65H 2405/1134* (2013.01); *B65H 2405/1142* (2013.01); *B65H 2405/11425* (2013.01); *B65H 2405/1144* (2013.01); *B65H 2405/3322* (2013.01)

(58) Field of Classification Search
CPC ...... B41J 13/106; B65H 1/04; B65H 2405/10; B65H 2405/11; B65H 2405/1134; B65H 2405/1142; B65H 2405/11425; B65H 2405/1144; B65H 2405/3322
See application file for complete search history.

(56) References Cited

U.S. PATENT DOCUMENTS 5,746,528 A * 5/1998 Mayer .................... B65H 31/20 400/625
7,748,705 B2 * 7/2010 Yamada ................. B65H 31/02 271/211
RE46,524 E * 8/2017 Ishida .................... B65H 29/70
2009/0085278 A1 4/2009 Izuchi
2018/0354739 A1 * 12/2018 Shimmachi ............ B65H 31/20

FOREIGN PATENT DOCUMENTS

JP 2015034065 A 2/2015
JP 2018203524 A 12/2018

* cited by examiner

*Primary Examiner* — Henok D Legesse
(74) *Attorney, Agent, or Firm* — Canon U.S.A., Inc. IP Division

(57) ABSTRACT

A printing apparatus includes a discharge unit and a tray. The discharge unit discharges a recording medium printed by a print unit in a first direction. The tray includes a supporting surface that supports the recording medium discharged from the discharge unit, a protruding portion that forms part of the supporting surface and that protrudes in a second direction intersecting the first direction, and a convex portion that is provided on the supporting surface and that protrudes upward from the supporting surface. The convex portion is formed on an inner side of the protruding portion in the second direction and overlaps the protruding portion in the first direction.

7 Claims, 9 Drawing Sheets

PRINTING APPARATUS TO PREVENT PAPER-JAMMING

BACKGROUND

Field

The present disclosure relates to a printing apparatus.

Description of the Related Art

Some existing printing apparatuses have a configuration in which a tray for supporting a printed recording medium can be retracted into and withdrawn from the printing apparatus. The configuration to support a printed recording medium by using a withdrawn tray when the recording medium is discharged can reduce the size of a printing apparatus as compared with a configuration in which the tray is provided inside the apparatus.

Japanese Patent Laid-Open No. 2018-203524 describes a configuration in which the inclination angle of a tray that is retracted inside the apparatus is set to be greater than the inclination angle of the tray that is withdrawn from the apparatus. This configuration reduces the apparatus size when the printing apparatus is not used and increases the region accessible through the opening of the tray and, thus, improves the workability of a user.

In the above noted existing printing apparatuses, some configurations require a guide unit for sliding the tray to a position between an outer cover of the printing apparatus and the tray. Therefore, even when the tray is retracted inside the printing apparatus, the guide unit is exposed to the outside, which is likely to deteriorate the appearance quality.

In contrast, the appearance quality can be improved by a configuration in which when the tray is retracted, a surface exposed to the outside and a supporting surface for supporting a recording medium protrude in the width direction of the tray so as to cover the guide unit. However, a discharge failure of the recording medium may occur due to contact of an end portion of the discharged recording medium with the protruding portion.

SUMMARY

Accordingly, the present disclosure provides a printing apparatus capable of suitably discharging a recording medium.

According to an aspect of the present disclosure, a printing apparatus includes a discharge unit configured to discharge a recording medium printed by a print unit in a first direction, and a tray including a supporting surface configured to support the recording medium discharged from the discharge unit, a protruding portion that forms part of the supporting surface and that protrudes in a second direction intersecting the first direction, and a convex portion that is provided on the supporting surface and that protrudes upward from the supporting surface, wherein the convex portion is formed on an inner side of the protruding portion in the second direction and overlaps the protruding portion in the first direction.

Further features of the present disclosure will become apparent from the following description of exemplary embodiments with reference to the attached drawings.

DESCRIPTION OF THE EMBODIMENTS

Embodiments of the present disclosure are described below with reference to the accompanying drawings. However, the example embodiments described below are in no way intended to limit the disclosure. All of the features and the combinations thereof described in the embodiments are not necessarily deemed to be essential to every embodiment of the present disclosure. In addition, it should be noted that the relative locations, the shapes, and the like of the constituent elements described in the embodiments are only illustrative and are not intended to limit the scope of the present disclosure only to those examples.

The term "printing" includes not only formation of meaningful information, such as characters and figures, but also formation of an image, a design, a pattern, and the like on a recording medium regardless of whether they are meaningful or meaningless, or processing of a medium. It does not matter whether those printed are recognizable by the human eye. In addition, although the present embodiment is described with reference to a recording medium that is paper, the recording medium may be cloth, a plastic film, or the like.

Like the term "printing" above, the term "ink" (also referred to as "liquid") should be interpreted broadly. Therefore, the term "ink" refers to liquid applied onto a recording medium to form an image, a design, a pattern, and the like or liquid usable to process a recording medium or ink (for example, solidify or insolubilize a colorant in the ink applied to a recording medium).

First Embodiment

Figure 1A:
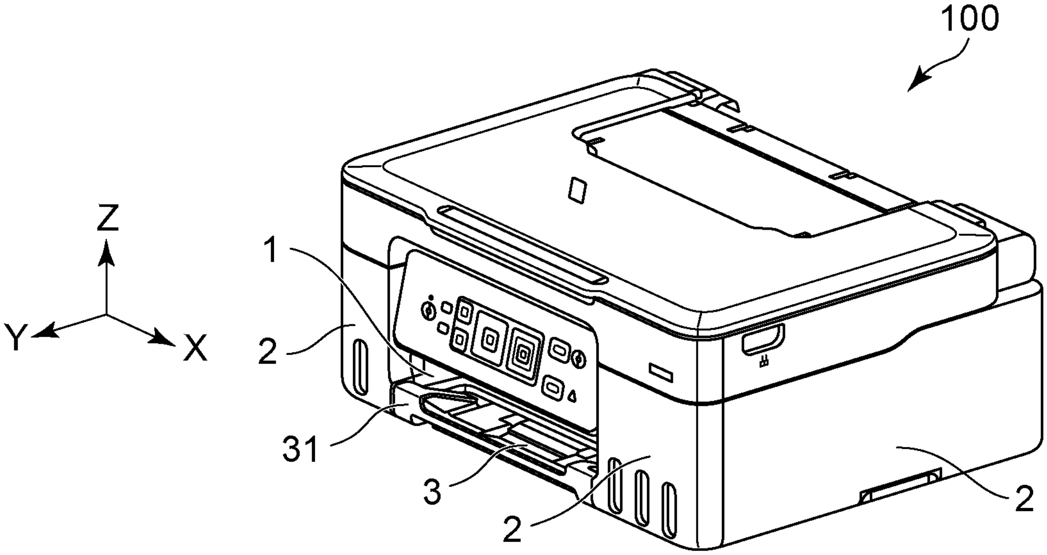
FIGS. 1A and 1B are external perspective views of a printing apparatus according to a first embodiment.
Figure 1B:
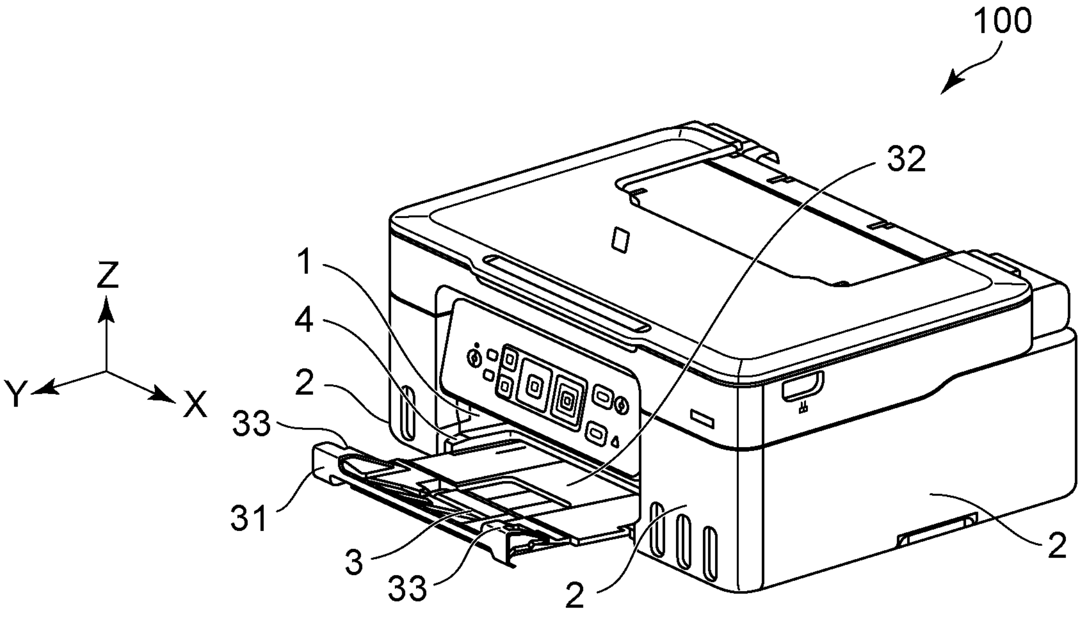

FIGS. 1A and 1B are perspective views of the external appearance of a printing apparatus 100 according to the first embodiment. The X direction in FIGS. 1A and 1B is the width direction of the printing apparatus 100 (the right-left direction, the width direction of a recording medium), and the Y direction is the depth direction of the printing apparatus 100 (the front-rear direction). The Z direction is the up-down direction (the direction of gravity). The X, Y, and Z directions intersect (perpendicularly) one another.

The printing apparatus 100 includes a housing 1 and an outer cover 2 that covers the housing 1 and creates the appearance of the printing apparatus 100. The printing apparatus 100 further includes an ejection tray 3 that supports a recording medium printed by a print unit 5 (described below). FIG. 1A illustrates the ejection tray 3 that is retracted inside the printing apparatus 100, and FIG. 1B illustrates the ejection tray 3 that is withdrawn from the printing apparatus 100. The ejection tray 3 is slidably (withdrawably) held and guided by a rail unit (guide unit) 4 provided in the housing 1.

Figure 2:
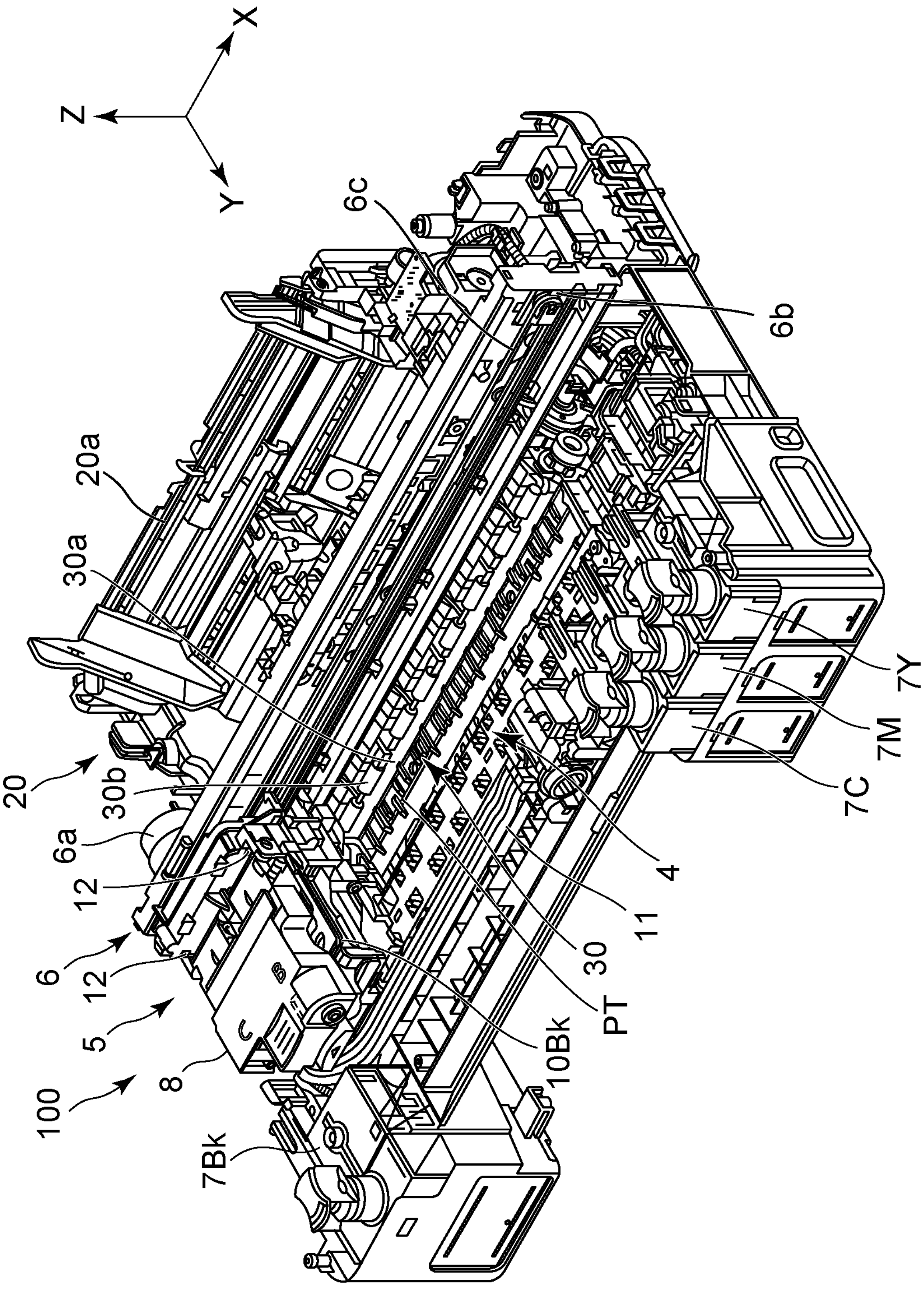
FIG. 2 is a perspective view of the internal configuration of the printing apparatus according to the first embodiment.

FIG. 2 is a perspective view of the internal configuration of the printing apparatus 100. In FIG. 2, the ejection tray 3 is not illustrated. The printing apparatus 100 according to the present embodiment is an inkjet printing apparatus that ejects ink to perform printing on a recording medium. However, in addition to the inkjet printing apparatus, the present disclosure is applicable to various other printing apparatuses, such as an electrophotographic printing apparatus.

The printing apparatus 100 includes a feed unit 20, a conveying unit 30, and a discharge unit 40 for conveying a recording medium. The feed unit 20 includes a feeding tray 20*a* and a recording medium feeding mechanism (not illustrated). Sheet-like recording media are stacked on the feeding tray 20*a*. The feeding mechanism includes, for example, a feeder roller that feeds the recording medium on the feeding tray 20*a* and a feeding motor that serves as a drive source for rotating the feeder roller.

The conveying unit 30 is a mechanism that conveys the recording medium fed from the feed unit 20 in the Y direction (the conveyance direction). The conveying unit 30 includes a conveyance roller 30*a* and a convey motor (not illustrated) that serves as a drive source for rotating the conveyance roller 30*a*. A pinch roller 30*b* is in pressure contact with the conveyance roller 30*a*, and the recording medium is nipped at the nip portion formed between the conveyance roller 30*a* and the pinch roller 30*b*. The recording medium is conveyed on a platen PT by the rotation of the conveyance roller 30*a*.

The discharge unit 40 is a mechanism that further conveys the recording medium conveyed from the conveying unit 30 in the Y direction (a sub-scanning direction). The discharge unit 40 includes a discharge roller, a convey motor that serves as a drive source for rotating the discharge roller, and a spur that is in contact with the discharge roller (none of which is illustrated) to discharge the recording medium onto the ejection tray 3.

Containers 7Bk, 7C, 7M, and 7Y (hereinafter collectively referred to as a container 7 when not distinguished) are ink tanks that contain liquid ink. According to the present embodiment, the container 7 is a stationary container fixed to the printing apparatus 100. When the ink remaining amount is low, a user fills (replenishes) the container 7 with ink without removing the container 7 from the printing apparatus 100. The four containers 7 contain different types of ink. According to the present embodiment, the container 7Bk contains black ink, the container 7C contains cyan ink, the container 7M contains magenta ink, and the container 7Y contains yellow ink. The number of ink types is not limited to four as in the present embodiment and may be one or a plurality of types other than four types. The number of the containers 7 can be greater than or equal to the number of the ink types.

The printing apparatus 100 includes the print unit 5. The print unit 5 includes a print head that ejects ink and a carriage that supports the print head and moves in the X direction. The print unit 5 is covered with a headset cover 8 from above. The print head is a print head that performs printing by ejecting ink supplied from the container 7 onto a recording medium. The print head 10 includes an ejection surface having, formed therein, a plurality of nozzles each for ejecting ink. An ejection surface 101 is disposed to face the platen PT. Each of the nozzles includes, for example, an electrothermal transducer element (a heater). When energized, the electrothermal transducer element heats ink to bubble the ink, and the ink is ejected using the blowing energy. A structure in which ink is ejected by a piezoelectric transducer instead of by the electrothermal transducer element may be employed.

The print unit 5 is reciprocated by the drive unit 6 in the X direction (the main scanning direction). The drive unit 6 includes a drive pulley and a driven pulley (only a driven pulley 6*b* is illustrated in FIG. 2) spaced apart in the X direction, a seamless belt 6*c* wound around the pulleys, and a carriage motor 6*a* that serves as a drive source for rotating the drive pulley. The print unit 5 is connected to the seamless belt 6*c*, and the print unit 5 is moved in the X direction by the movement of the seamless belt 6*c*.

An image is printed by ejecting ink from the print head onto the recording medium on the platen PT while the print unit 5 is moving. This operation is also referred to as "print scan". The printing operation is performed by alternately repeating the conveying operation of the recording medium by the conveying unit 30 and the print scan. That is, the conveying unit 30 intermittently conveys a recording medium and performs print scan when the conveyance of the recording medium is stopped. Thus, an image is printed on the recording medium.

As described above, the printing apparatus 100 is a serial type inkjet printing apparatus in which a print head is mounted in the print unit 5 that reciprocates in the X direction. However, the present disclosure is applicable to other printing apparatuses, such as an inkjet printing apparatus equipped with a print head known as a full-line head. A full-line head includes a plurality of nozzles for ejecting liquid in a region corresponding to the width of a recording medium.

Figure 3:
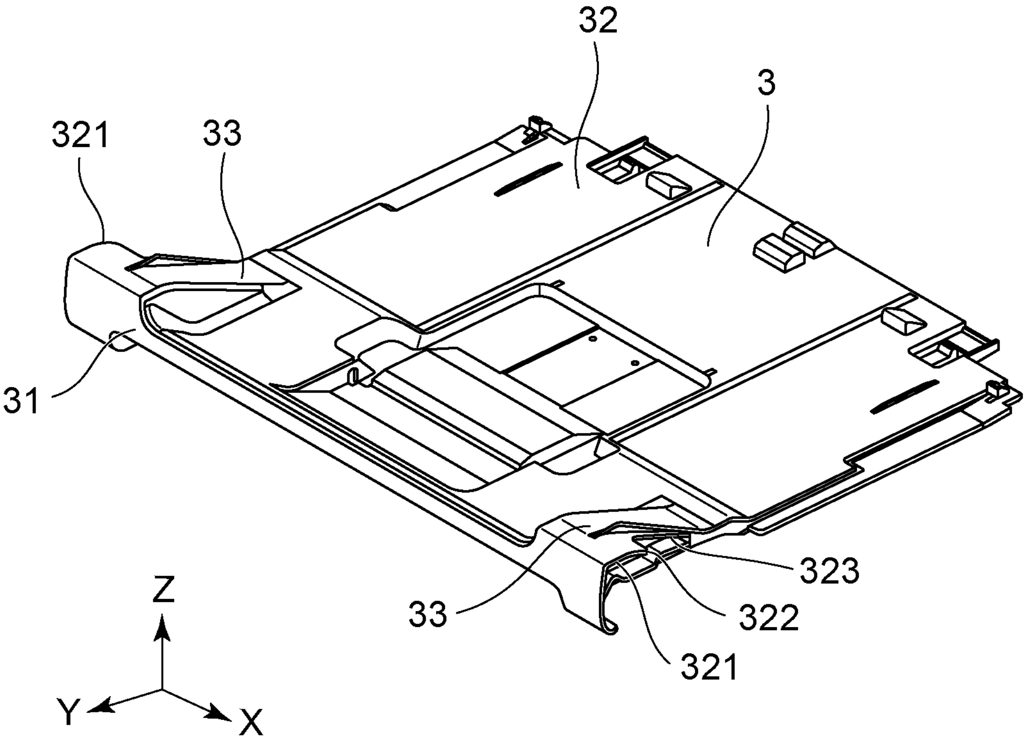
FIG. 3 is a perspective view of the top surface of an ejection tray according to the first embodiment.

FIG. 3 is a perspective view of the top surface of the ejection tray 3. The ejection tray 3 has an exterior surface 31 that is adjacent to the outer cover 2 and that constitutes the external appearance of the apparatus with the ejection tray 3 retracted. The exterior surface 31 extends in the XZ plane and constitutes the front surface of the printing apparatus 100. The ejection tray 3 further has a supporting surface 32 that forms part of a conveyance path 99 (refer to FIG. 5B) for the discharged recording medium and that supports the recording medium.

Furthermore, the ejection tray 3 includes a guide rib 33 that is a convex portion formed as part of the conveyance path 99 and located downstream of the supporting surface 32 in the Y direction. The guide rib 33 protrudes upward from the supporting surface 32 and has an inclined surface that inclines upward toward the downstream in the Y direction. According to the present embodiment, the top surface of the guide rib 33 at the downstream end in the Y direction is connected to the exterior surface 31. As illustrated in FIG. 3, according to the present embodiment, two guide ribs 33 are provided so as to be spaced apart in the X direction.

Figure 4A:
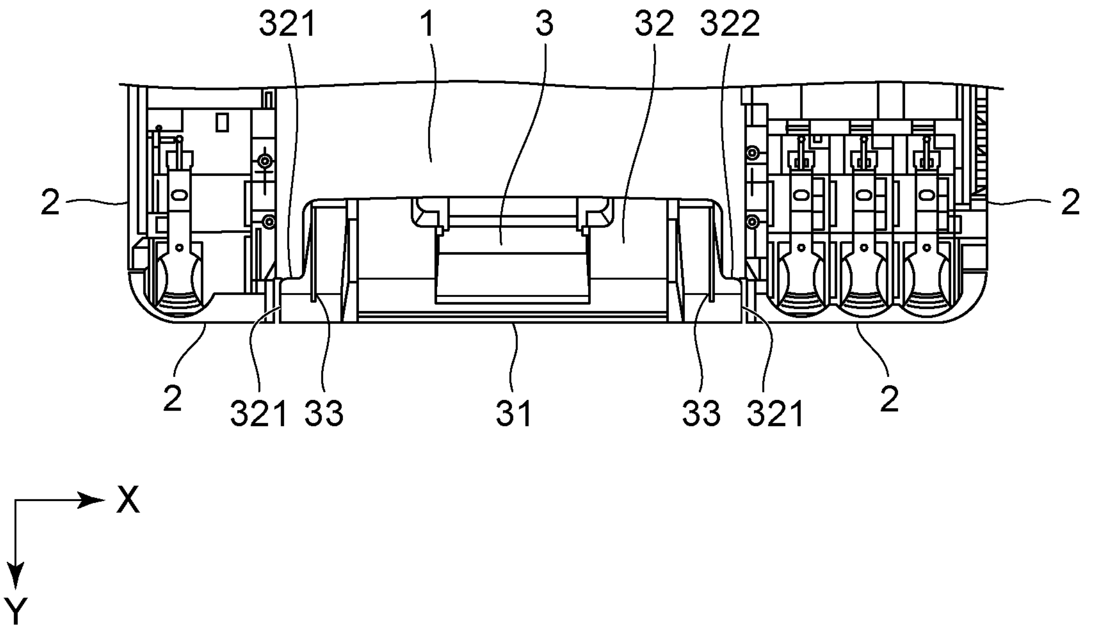
FIGS. 4A and 4B are schematic top views of the ejection tray and its vicinity according to the first embodiment.
Figure 4B:
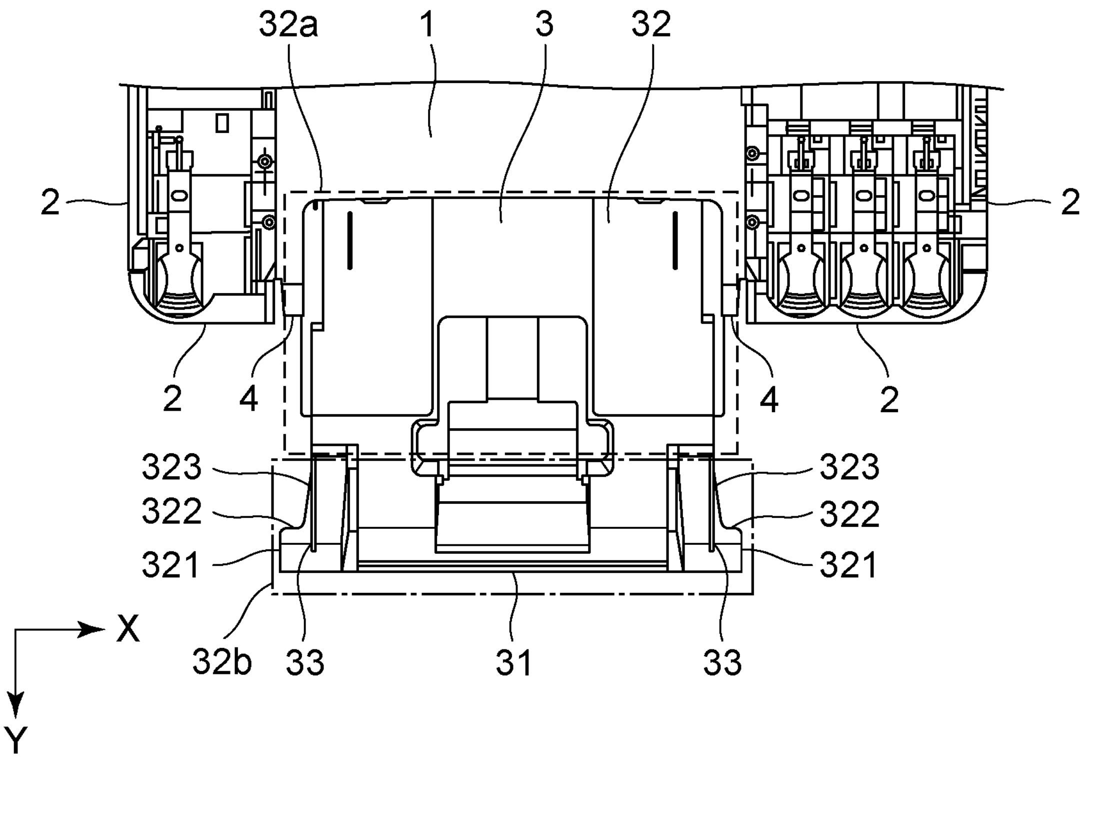

FIGS. 4A and 4B are schematic top views of the front side of the printing apparatus 100 around the ejection tray 3 as viewed from above. FIG. 4A illustrates the ejection tray 3 that is retracted, and FIG. 4B illustrates the ejection tray 3 that is withdrawn. As illustrated in FIG. 4B, the exterior surface 31 and the supporting surface 32 of the ejection tray 3 overlap the rail units 4 of the housing 1 in the X direction. As a result, as illustrated in FIG. 4A, when the ejection tray 3 is retracted, the front sides (the downstream sides in the Y direction) of the rail units 4 are covered with the ejection tray 3 and, thus, the rail units 4 are not exposed on the front side of the printing apparatus 100.

As illustrated in FIG. 4B, the supporting surface 32 includes a first portion 32*a* (a portion surrounded by a dotted line) guided by the rail units 4 on the upstream side in the Y direction and a second portion 32*b* (a portion surrounded by an alternate long and short dash line) having a length in the X direction that is increased from the length of the first portion 32*a*. Since the second portion 32*b* is wider than the first portion 32*a* in the X direction, a ridgeline that connects a ridgeline 323 at the end of the first portion 32*a* in the X direction with a ridgeline 321 at the end of the second portion 32*b* in the X direction includes a protruding portion (bending portion) 322 protruding in the X direction.

Figure 5A:
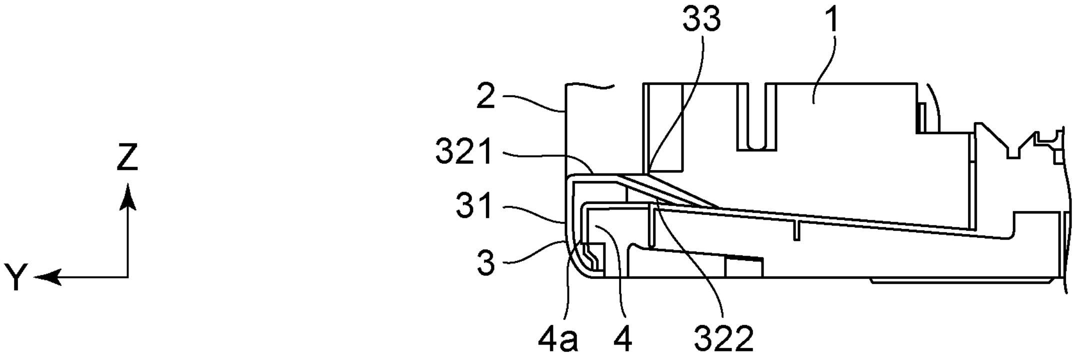
FIGS. 5A and 5B are schematic cross-sectional views of the ejection tray and its vicinity as viewed from the right side, according to the first embodiment.
Figure 5B:
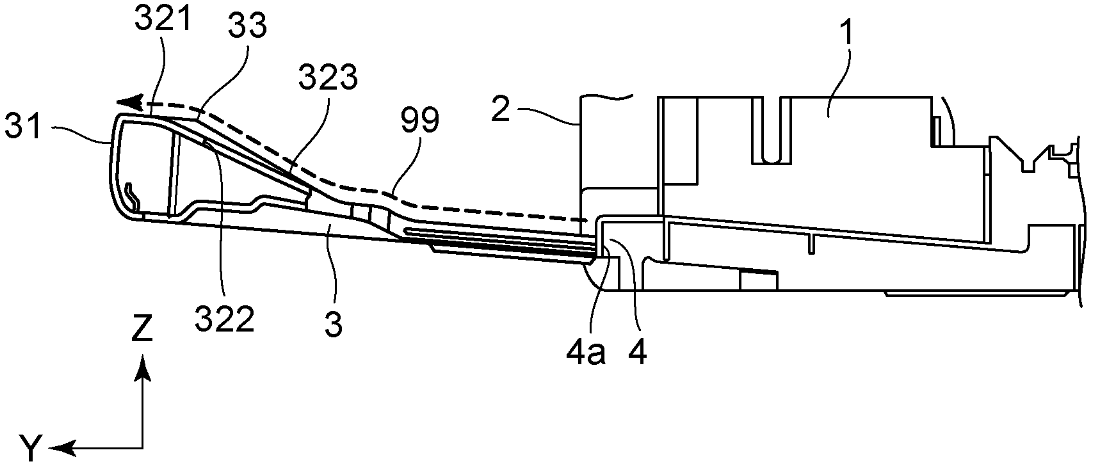

FIGS. 5A and 5B are schematic cross-sectional views of the configuration of the ejection tray 3 and the rail unit 4 and their vicinity as viewed from the right side of the printing apparatus 100. FIG. 5A illustrates the ejection tray 3 that is retracted, and FIG. 5B illustrates the ejection tray 3 that is withdrawn. According to the present embodiment, the protruding portion 322 of the ejection tray 3 is disposed upstream of the downstream end of the rail unit 4 in the Y direction. In this configuration, when the ejection tray 3 is retracted as illustrated in FIG. 5A, part of the rail unit 4 including a front end 4*a* of the rail unit 4 is covered by the protruding portion 322 of the supporting surface 32 from above.

Figure 6A:
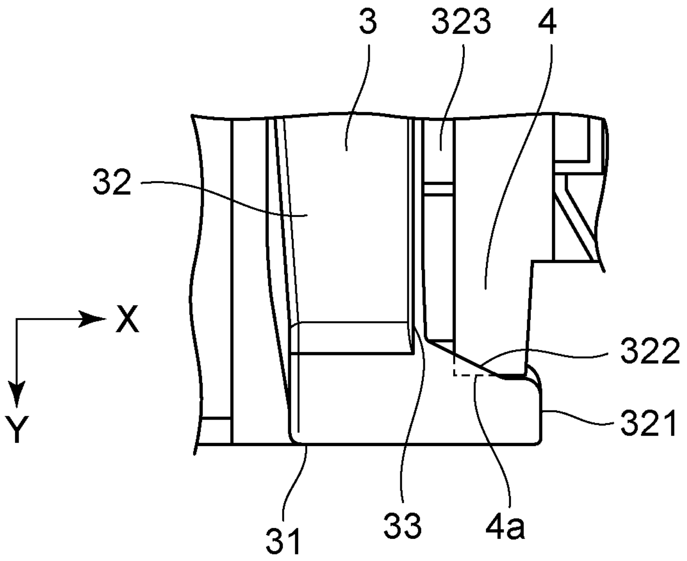
FIGS. 6A and 6B are top views of a bending portion and its vicinity with the ejection tray retracted, according to the first embodiment.
Figure 6B:
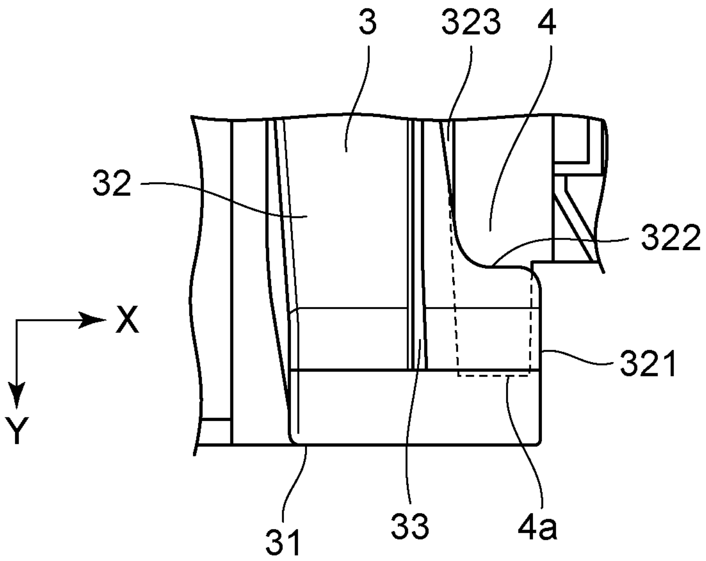

FIGS. 6A and 6B are schematic top views of an example of the configuration around the protruding portion 322 of the ejection tray 3 that is retracted. As illustrated in FIG. 6A, if the protruding portion 322 and the rail unit 4 overlap even a little in the Y direction, part of the rail unit 4 including the front end 4*a* of the rail unit 4 can be covered from above and, thus, the appearance quality of the printing apparatus 100 can be improved. As illustrated in FIG. 6B, it is desirable to increase the region where the protruding portion 322 and the rail unit 4 overlap each other in the Y direction, because the appearance quality of the printing apparatus 100 can be further improved.

Figure 7:
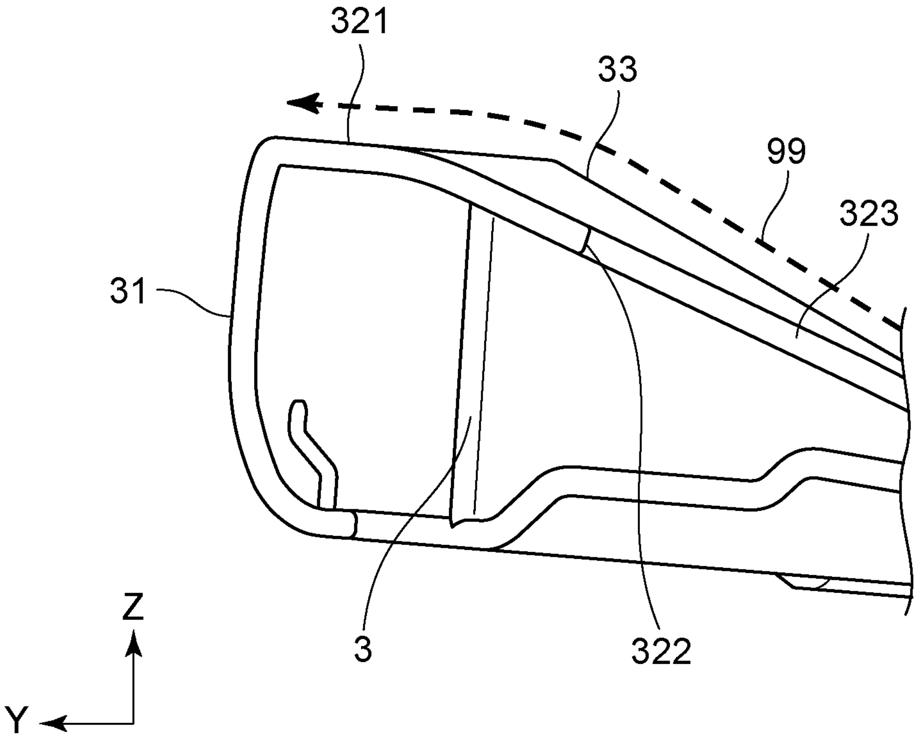
FIG. 7 is a side view of a front end portion of the ejection tray according to the first embodiment.

FIG. 7 is a side view illustrating the details of the front end portion of the ejection tray 3 illustrated in FIG. 5B. The guide rib 33 of the ejection tray 3 extends from the upstream of the protruding portion 322 in the Y direction to a position at which the guide rib 33 overlaps the protruding portion 322. In addition, the guide rib 33 is disposed on the inner side of the protruding portion 322 in the X direction (adjacent to the center of the ejection tray in the X direction). With this configuration, a recording medium discharged by the discharge unit 40 is supported on the guide rib 33 before reaching the protruding portion 322, as indicated by the conveyance path 99. As the ejection progresses, the recording medium is guided upward along the inclined surface of the guide rib 33. As a result, the leading edge of the recording medium is guided higher than the protruding portion 322 in the height direction.

Since as described above, the recording medium is guided by the guide rib 33 in a direction away from the protruding portion 322 in the height direction, it is less likely that the recording medium is brought into contact with the protruding portion 322, and the recording medium can be suitably discharged.

While description has been made with reference to the protruding portion 322 and the guide rib 33 provided on the right side of the ejection tray 3 as viewed from the front of the apparatus illustrated in FIGS. 5A to 7, the protruding portion 322 and the guide rib 33 are also provided on the left side of the ejection tray 3 in a similar configuration, as illustrated in FIGS. 3 and 4B.

According to the above-described configuration, the rail unit 4 can be hidden when the ejection tray 3 is retracted and, thus, the appearance quality of the region that is visible to a user can be improved. Furthermore, since a discharged recording medium is guided onto the guide ribs 33, contact of the recording medium with the protruding portions 322 is prevented, and the occurrence of paper-jamming during conveyance can be prevented. That is, the appearance quality of the printing apparatus 100 can be improved while ensuring the recording medium discharge stability.

Depending on the placement location of the guide rib 33, even if the recording medium is conveyed onto the guide rib 33, the leading edge portion of a recording medium may hang down due to its own weight and be brought into contact with the protruding portion 322. For this reason, it is desirable that the guide rib 33 is disposed near the protruding portion 322 in the X direction.

Second Embodiment

Figure 8A:
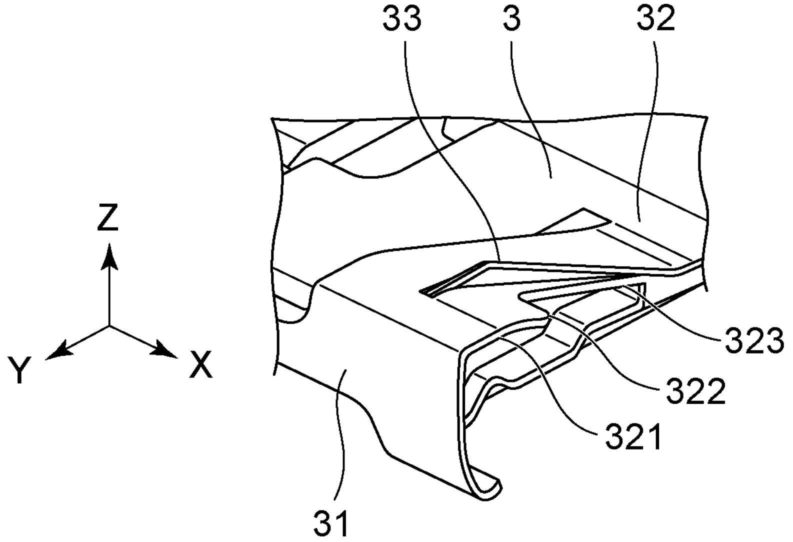
FIGS. 8A and 8B are enlarged perspective views of an ejection tray according to a second embodiment.
Figure 8B:
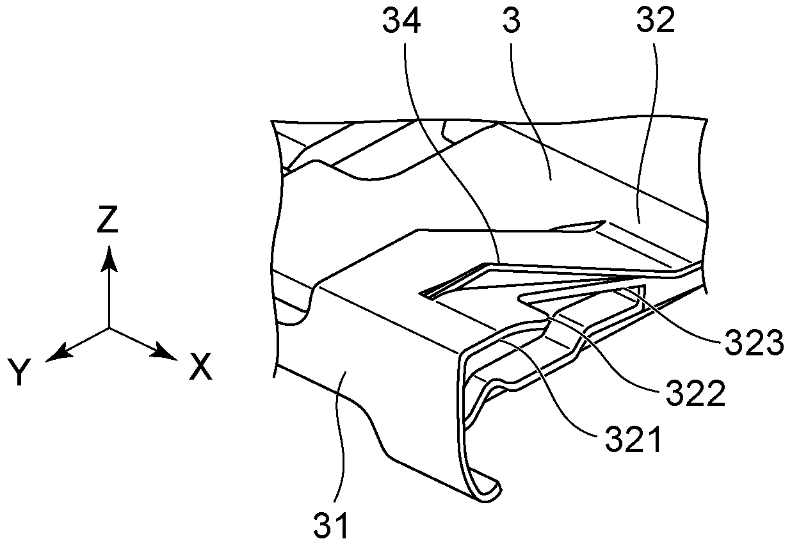

FIG. 8A is an enlarged perspective view of a guide rib 33 and its vicinity according to the first embodiment, and FIG. 8B is an enlarged perspective view of an inclined surface shape 34 and its vicinity according to the second embodiment. According to the first embodiment, as illustrated in FIG. 8A, the guide rib 33 is provided on the supporting surface 32. However, as illustrated in FIG. 8B, a configuration may be employed in which part of the supporting surface 32 is protruded so as to serve as the inclined surface shape 34 (the convex portion). In this case, the inclined surface shape 34 is provided on the inner side of the protruding portion 322 in the X direction and is provided in a region where the inclined surface shape 34 overlaps the protruding portion 322 in the Y direction, so that the same effect as in the first embodiment can be obtained.

Third Embodiment

Figure 9:
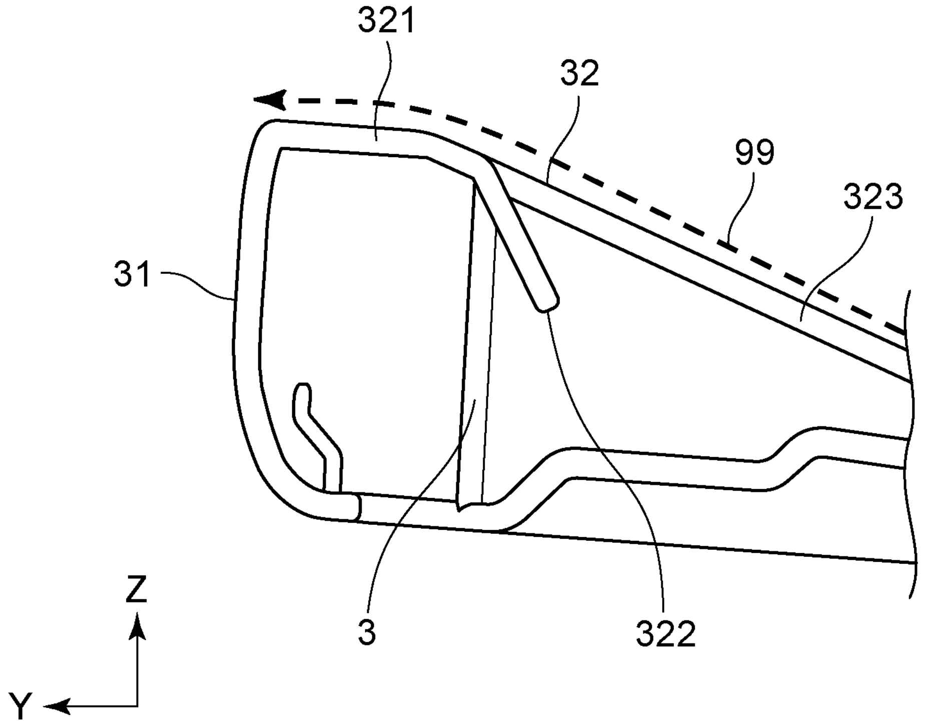
FIG. 9 is a cross-sectional view of the front end portion of an ejection tray viewed from the right side, according to a third embodiment.

FIG. 9 is a cross-sectional view of a front end portion of the ejection tray 3 viewed from the right side, according to the third embodiment. According to the third embodiment, as illustrated in FIG. 9, the protruding portion 322 is inclined so that the upstream end of the protruding portion 322 in the Y-direction is below the supporting surface 32. At this time, it is required that the inclined protruding portion 322 does not interfere with the rail unit 4 when the ejection tray 3 is retracted. With such a configuration, the discharged recording medium is guided above the protruding portion 322 along the conveyance path 99. As a result, like the first embodiment, the recording medium can be suitably discharged.

Fourth Embodiment

Figure 10:
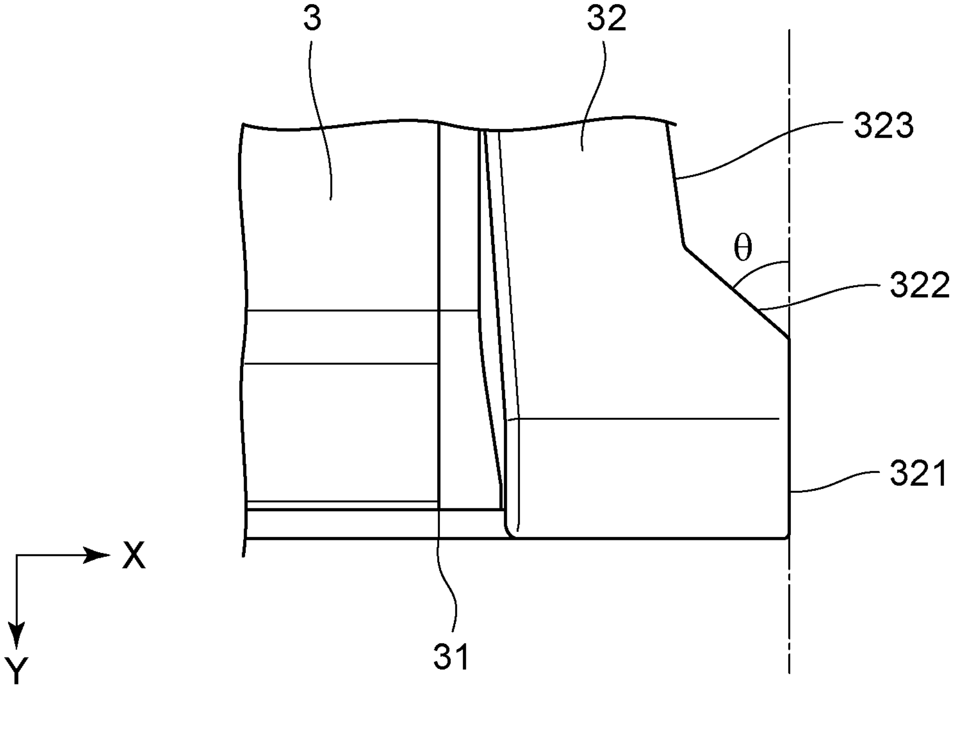
FIG. 10 is a top view of the front end portion of an ejection tray according to a fourth embodiment.

FIG. 10 is a top view of the front end portion of an ejection tray 3 according to the fourth embodiment. According to the fourth embodiment, instead of providing the guide rib 33, a bending angle θ of the protruding portion 322 is set to less than or equal to 60 degrees with respect to the Y direction that is the conveyance direction. With such a configuration, even if the discharged recording medium is brought into contact with the protruding portion 322, the discharge operation is not interfered, and the recording medium discharge stability can be ensured as in the first embodiment.

It should be noted that the configuration of the third or fourth embodiment can be combined with the configuration of the first or second embodiment. In this case, the recording medium discharge stability can be further improved.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-170215 filed Oct. 24, 2022, which is hereby incorporated by reference herein in its entirety.

What is claimed is:

1. A printing apparatus comprising:

a discharge unit configured to discharge a recording medium printed by a print unit in a first direction; and a tray including a supporting surface configured to support the recording medium discharged from the discharge unit, a protruding portion that forms part of the supporting surface and that protrudes in a second direction intersecting the first direction, and an inclined portion connected to an upstream side of the protruding portion in the first direction and configured to incline upward toward downstream from upstream in the first direction; and a convex portion configured to protrude upward from the inclined portion, wherein a downstream part of the convex portion in the first direction is formed on an inner side of the protruding portion in the second direction and overlaps the protruding portion in the first direction.

2. The printing apparatus according to claim 1, wherein the convex portion includes an inclined surface that inclines upward toward downstream from upstream in the first direction.

3. The printing apparatus according to claim 1, wherein the convex portion is disposed near the protruding portion in the second direction.

4. The printing apparatus according to claim 1, further comprising a guide unit configured to guide the tray so that the tray is withdrawable from the printing apparatus, wherein, when the tray is retracted inside the printing apparatus, the protruding portion covers at least part of the guide unit from above.

5. The printing apparatus according to claim 1, wherein the protruding portion has a bending angle that is less than or equal to 60 degrees with respect to the first direction.

6. The printing apparatus according to claim 1, wherein the convex portion is a rib and supports the recording medium discharged from the discharge unit.

7. The printing apparatus according to claim 1, comprising:

a housing configured to house a print head; and a container fixed to a front side of the housing and configured to contain ink supplied to the print head, wherein the tray includes an exterior surface and the exterior surface constitutes the front side of the housing.

* * * * *